(No Model.) 2 Sheets—Sheet 1.
O. OFFRELL.
ALTERNATING CURRENT MOTOR.
No. 520,800. Patented June 5, 1894.
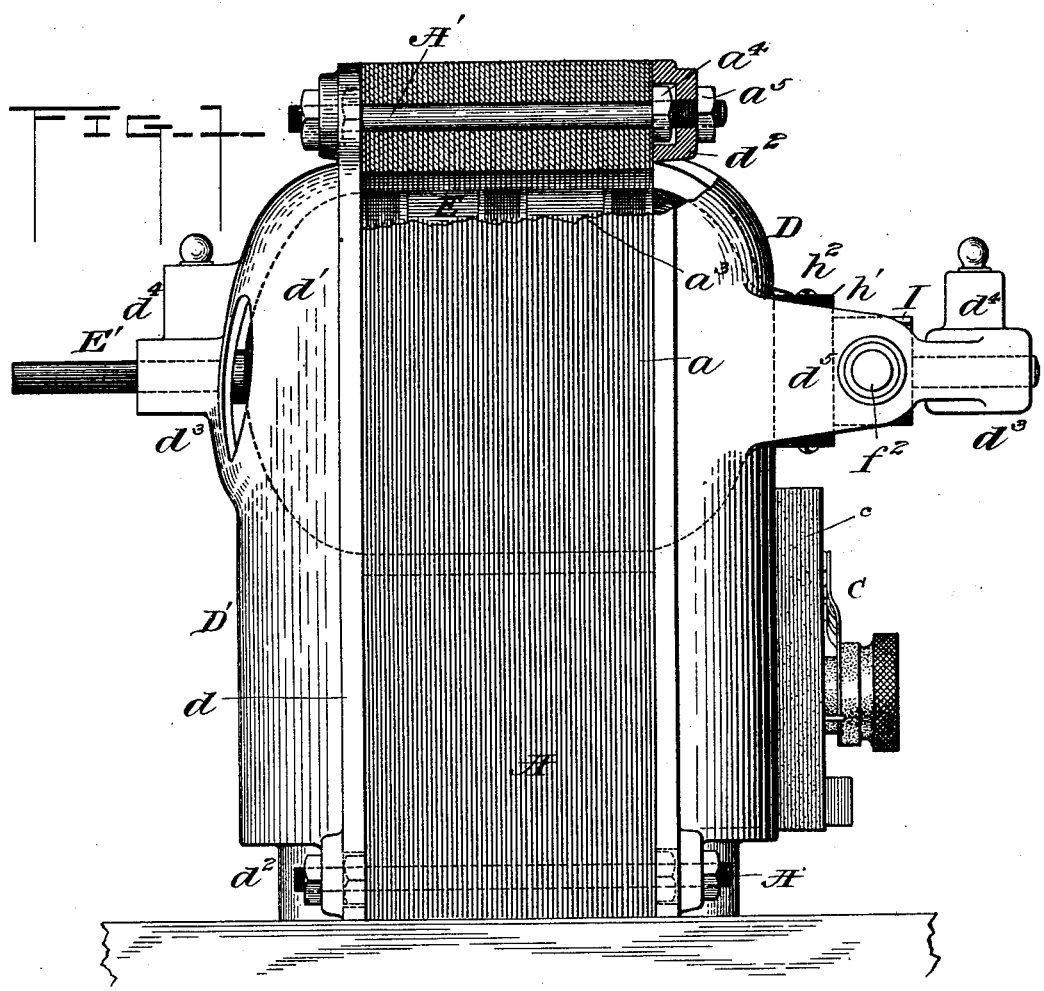
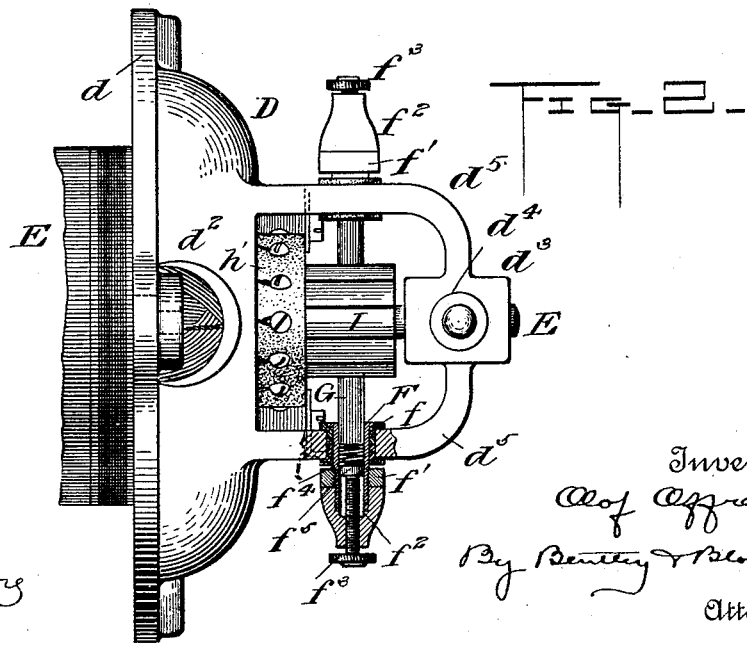
Witnesses
Inventor
Adof Offrell
By Bentley & Blodgett
Attorneys (No Model.) 2 Sheets—Sheet 2.

O. OFFRELL.
ALTERNATING CURRENT MOTOR.

No. 520,800. Patented June 5, 1894.

Witnesses
Inventor
Olof Offrell
By Bentley & Blodgett
Attorneys

UNITED STATES PATENT OFFICE.

OLOF OFFRELL, OF MIDDLETOWN, CONNECTICUT, ASSIGNOR TO THE SCHUYLER ELECTRIC COMPANY, OF CONNECTICUT.

ALTERNATING-CURRENT MOTOR.

SPECIFICATION forming part of Letters Patent No. 520,800, dated June 5, 1894.

Application filed November 29, 1892. Serial No. 453,475. (No model.)

*To all whom it may concern:*

Be it known that I, OLOF OFFRELL, a citizen of the United States, residing at Middletown, county of Middlesex, State of Connecticut, have invented a certain new and useful Improvement in Alternating-Current Motors, of which the following is a specification.

My invention relates to electric motors, and its object is to provide a compact alternating current motor of simple construction and high efficiency.

The invention consists in a motor of the type named, having its field magnet core composed of laminations of sheet iron insulated from one another by sheets of paper, the whole clamped firmly together between end frames of non-magnetic metal, said frames containing bearings for the armature shaft. The construction of the commutator also, is novel, and so too is that of the brush holders. The field coil is divided into sections and a switch is provided for connecting said sections either in series or in parallel as desired.

Figure 3:
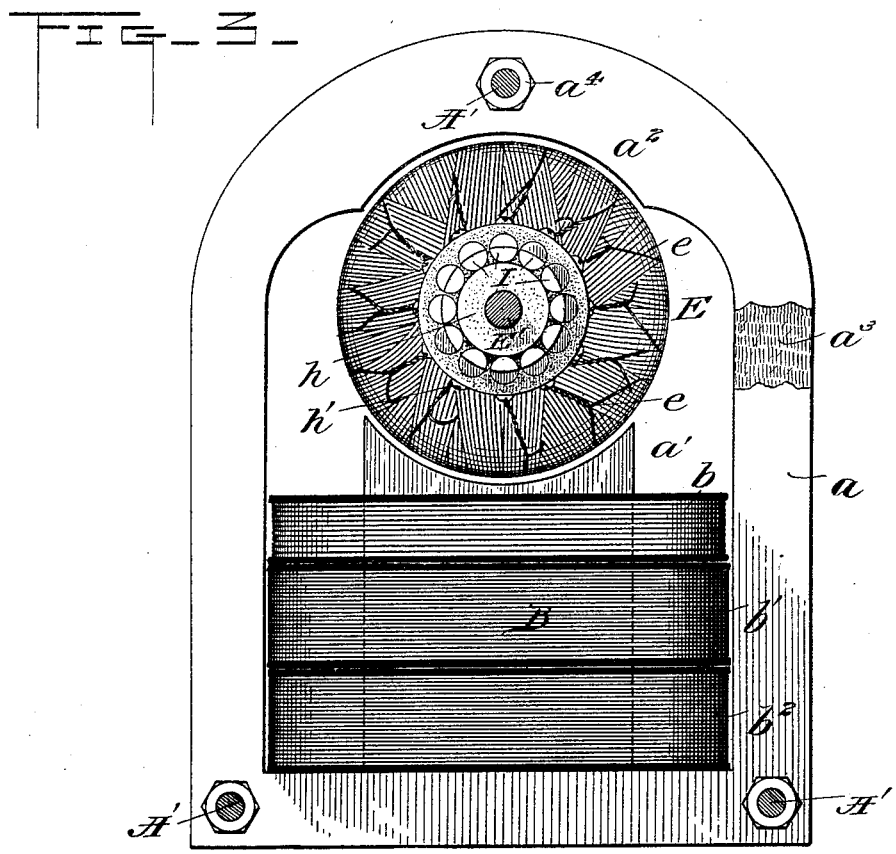
Figure 4:
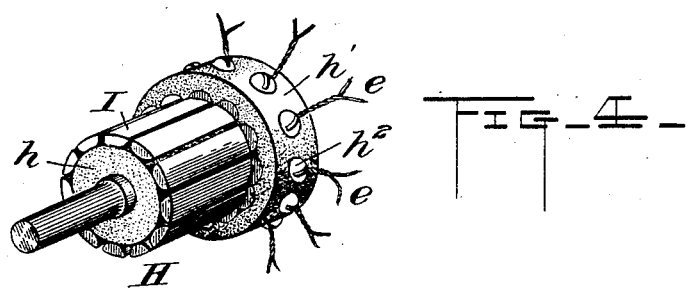

In the accompanying drawings, Figure 1 is a side elevation of my improved motor partly broken away. Fig. 2 is a top plan view of the commutator and brush holders, one of which is shown in section. Fig. 3 is an end view with the frame removed, and Fig. 4 is a perspective view of the commutator.

The field magnet core A is composed of sheets of iron $a$ of substantially the form shown in Fig. 3, constituting a closed magnetic field, with poles $a'$, $a^2$. The iron sheets are insulated by paper $a^3$ placed between the laminations, and the whole is clamped together by the bolts A′ and nuts $a^4$.

Surrounding the pole piece $a'$ is the field magnet coil B, which is divided into sections $b$, $b'$, $b^2$, and the like. One section, as $b$, is preferably wound with German silver wire, to form a permanent resistance in the circuit. The sections $b'$, $b^2$ are connected with contact points, traversed by a switch C mounted on a hard rubber block $c$, and by means of which the sections can be placed in series or in parallel. The armature is in series with the field, in both instances. The construction of this switch forms no part of my invention, and its arrangement is so well known that it needs no description here.

The field magnet core is firmly held between two end frames D, D′ of non-magnetic metal, such as brass or composition. They are of substantially the shape shown, having a plane flange $d$ to seat against the core A, and a dished portion $d'$ to fit around the coil B and the ends of the armature E. At the points where the bolts A′ project are cupped portions $d^2$ to cover the nuts $a^4$. The bolts extend through the frames and are provided with outer nuts $a^5$ to hold the frames tightly against the core. Cast with each frame is a bearing $d^3$ for the shaft E′ of the armature.

The bearings may have oil cups $d^4$. At the commutator end of the armature shaft, the bearing is carried on the ends of arms $d^5$ projecting from the frame D. The arms stand on opposite sides of the commutator and afford support for the brush holders. These each consist of a flanged sleeve F inserted through a hole in the arm $d^5$, from which it is insulated by a bushing $f$ of suitable material. The outer projecting end of the sleeve is screw-threaded to receive a nut $f'$, and a cap lock nut $f^2$ through the outer end of which or into the end of the sleeve is tapped a headed screw $f^3$. The brush is a short rod G, preferably of carbon, inserted into the inner end of the sleeve. A spring $f^4$ is compressed between the end of the rod, and the screw $f^3$, or follower $f^5$ resting against the end of the screw. The armature is of the drum type, and has any suitable winding. The commutator H is composed of a hub $h$ of hard rubber, or other suitable insulating material, on which are fixed the segments. It is preferred to form the hub with a flange $h'$ and to drill a row of holes through the flange parallel with the axis of the hub and tangent to its circumference. Into each hole is driven a brass or copper rod I, the several rods being out of contact with each other, and the cylinder of rods is then turned down until the exposed portion of each rod has been cut away to or nearly to its diameter, as shown. A screw $h^2$ is inserted radially into the flange to engage with and hold each rod. The leads $e$ from the armature coils are also held by said screws, and are thereby put in connection with the commutator segments I. The spaces between the segments may be left vacant as shown, or they may be filled with an insulating compound.

The fact that this motor has its field magnet and armature core made of laminated wrought iron, and that its windings are carefully proportioned, renders it highly efficient with an alternating current.

What I claim as new, and desire to secure by Letters Patent, is—

1. An electric motor comprising end frames having plane faces to fit against the field magnet core, and dished portions to inclose the field magnet coils, substantially as described.

2. An electric motor, comprising end frames having plane faces to fit against the field magnet core, and cupped portions to receive the clamping bolts which confine the laminæ of the core, substantially as described.

3. An electric motor comprising a laminated field magnet core A and end frames D, D', each having a flange $d$, a dished portion $d'$ and the shaft bearing $d^3$, substantially as described.

4. The combination with the laminated core A, of the clamping bolts A', and nuts $a^4$, the end frames D, D' having cupped portions $d^2$, and the nuts $a^5$, substantially as described.

5. An end frame for an electric motor, comprising a plane face $d$, a dished portion $d'$, a shaft bearing $d^3$, and arms $d^5$ supporting said bearing, substantially as described.

6. In an electric motor, a brush holder consisting of a sleeve, an insulating bushing surrounding said sleeve, a nut screwed upon said sleeve, a screw entering the end of said sleeve, a spring inclosed in the sleeve, and a rod of conducting material inserted in the sleeve against the spring, substantially as described.

7. A commutator consisting of the combination with an insulating hub having a flange, of a series of rods surrounding said hub and inserted into the flange, and screws passing radially into the flange and engaging with each rod, substantially as described.

In witness whereof I have hereto set my hand this 19th day of November, 1892.

OLOF OFFRELL.

Witnesses:
E. R. KNOWLES,
LEWIS T. ROBINSON.